US012561595B2

(12) United States Patent
Spariosu et al.

(10) Patent No.: US 12,561,595 B2
(45) Date of Patent: Feb. 24, 2026

(54) CASCADE SPOOF PROOF EXTRA-LAYER RADIANT AUTHENTICATION (CASPER-A) SYSTEM AND METHOD USING SPECTRALLY-CODED TAGGANTS

(71) Applicant: Raytheon Company, Arlington, VA (US)

(72) Inventors: Kalin Spariosu, Thousand Oaks, CA (US); Anthony Serino, Cambridge, MA (US)

(73) Assignee: Raytheon Company, Arlington, VA (US)

( * ) Notice: Subject to any disclaimer, the term of this patent is extended or adjusted under 35 U.S.C. 154(b) by 796 days.

(21) Appl. No.: 17/871,105

(22) Filed: Jul. 22, 2022

(65) Prior Publication Data

US 2024/0028941 A1 Jan. 25, 2024

(51) Int. Cl.
| | |
|---|---|
| *G06N 10/40* | (2022.01) |
| *H04L 9/08* | (2006.01) |
| *H04L 9/32* | (2006.01) |
| *B82Y 10/00* | (2011.01) |

(52) U.S. Cl.
CPC ........... *G06N 10/40* (2022.01); *H04L 9/0852* (2013.01); *H04L 9/3278* (2013.01); *B82Y 10/00* (2013.01)

(58) Field of Classification Search
CPC ..... G06N 10/40; H04L 9/0852; H04L 9/3278; B82Y 20/00; B82Y 10/00; H01L 51/50; G01J 3/443
See application file for complete search history.

(56) References Cited

U.S. PATENT DOCUMENTS

| | | | | |
|---|---|---|---|---|
| 7,985,590 | B2 * | 7/2011 | McNeil | B82Y 15/00 |
| | | | | 436/58 |
| 8,328,102 | B2 * | 12/2012 | Rapoport | G07D 7/1205 |
| | | | | 235/491 |
| 8,350,223 | B2 | 1/2013 | Mintz et al. | |
| 10,473,581 | B2 | 11/2019 | Chow et al. | |

(Continued)

FOREIGN PATENT DOCUMENTS

EP          2280255          9/2017

*Primary Examiner* — Sargon N Nano
(74) *Attorney, Agent, or Firm* — Schwegman Lundberg & Woessner, P.A.

(57) ABSTRACT

A Cascade Spoof Proof Extra-layer Radiant Authentication (CASPER-A) system using spectrally-coded taggants is configured to transmit a multi-wavelength optical interrogation signal to interrogate a nanotag associated with a device. A multi-spectral optical receiver may be configured to receive and decode a response to the interrogation signal that may comprise a multi-spectral emission generated by the nanotag. Processing circuitry may generate data from the decoded response. To authenticate the device associated with the nanotag, the processing circuitry may generate a digital signature. The nanotag may comprise a multi-layered nanocrystal (NC) activated composite material comprising multiple layers configured to generate a multi-spectral emission from optical excitation by the optical interrogation signal. Each layer may comprise a heterogeneously dispersed volume embedded with quantum dots (Qdots). The Qdots may be configured to generate a multi-spectral emission based on an interaction of one or more wavelengths among Qdot emitters by intercoupling.

20 Claims, 6 Drawing Sheets

UV TRANSMITTER / MULTISPECTRAL RECEIVER

UV EXCITATION

MULTISPECTRAL FLUORESCENCE EMISSION

TOP PAINT PARTIALLY TRANSPARENT

LAYERED COMPLEX QDOT COATING

NON DISCRETE BOUNDARY TRANSITION ZONES - COMBINATION OF ADJACENT / DIFFERENT BANDGAP QDOTS

MISSILE SHELL STRUCTURE

MULTI-SPECTRAL LAYERED NANO-TAG STRUCTURED

(56) References Cited

U.S. PATENT DOCUMENTS

| | | | | |
|---|---|---|---|---|
| 10,562,764 B2 * | 2/2020 | Leipold | .............. | G06F 11/0724 |
| 10,711,188 B2 | 7/2020 | Lin et al. | | |
| 10,759,993 B2 * | 9/2020 | Yang | ................... | C09K 11/025 |
| 10,800,654 B2 * | 10/2020 | Leipold | ................. | B82Y 15/00 |
| 12,025,706 B2 * | 7/2024 | Porcel Magnusson | ...................... | |
| | | | | G01S 17/74 |
| 2010/0248159 A1 * | 9/2010 | Menon | ................... | G03B 27/00 |
| | | | | 355/18 |
| 2015/0268017 A1 * | 9/2015 | Diemer | ..................... | F42B 7/02 |
| | | | | 102/439 |
| 2018/0142150 A1 * | 5/2018 | Lau | ...................... | C09K 11/025 |
| 2018/0224375 A1 * | 8/2018 | McDaniel | .......... | G01N 21/6489 |
| 2021/0080393 A1 * | 3/2021 | Williams | .............. | G07D 7/004 |
| 2022/0334054 A1 * | 10/2022 | Brogger | .............. | B42D 25/387 |
| 2023/0344516 A1 * | 10/2023 | Bersin | ................... | H04B 10/70 |

* cited by examiner 01101110011000010
110111001101111

2

3

AUTHENTIC

COUNTERFEIT

NANO TAG

CASCADE SPOOF PROOF EXTRA-LAYER RADIANT AUTHENTICATION (CASPER-A) SYSTEM AND METHOD USING SPECTRALLY-CODED TAGGANTS

TECHNICAL FIELD

Some embodiments pertain to multi-layered nanocrystal (NC) activated composites. Some embodiments relate to nanotags. Some embodiments relate to optical authentication including authentication of controlled items. Some embodiments relate to optical authentication using spectrally-coded taggants.

BACKGROUND

There are increasing needs to provide for assured authentication of numerous products and items including controlled documents, currency, electronics, and other items. Commercial as well as military procurement must rely on mission assurance including assured supply chain where most critical. This means providing stealthy secure anti-counterfeit, anti-spoof solutions to the civilian and DoD customers.

DETAILED DESCRIPTION

Figure 1:
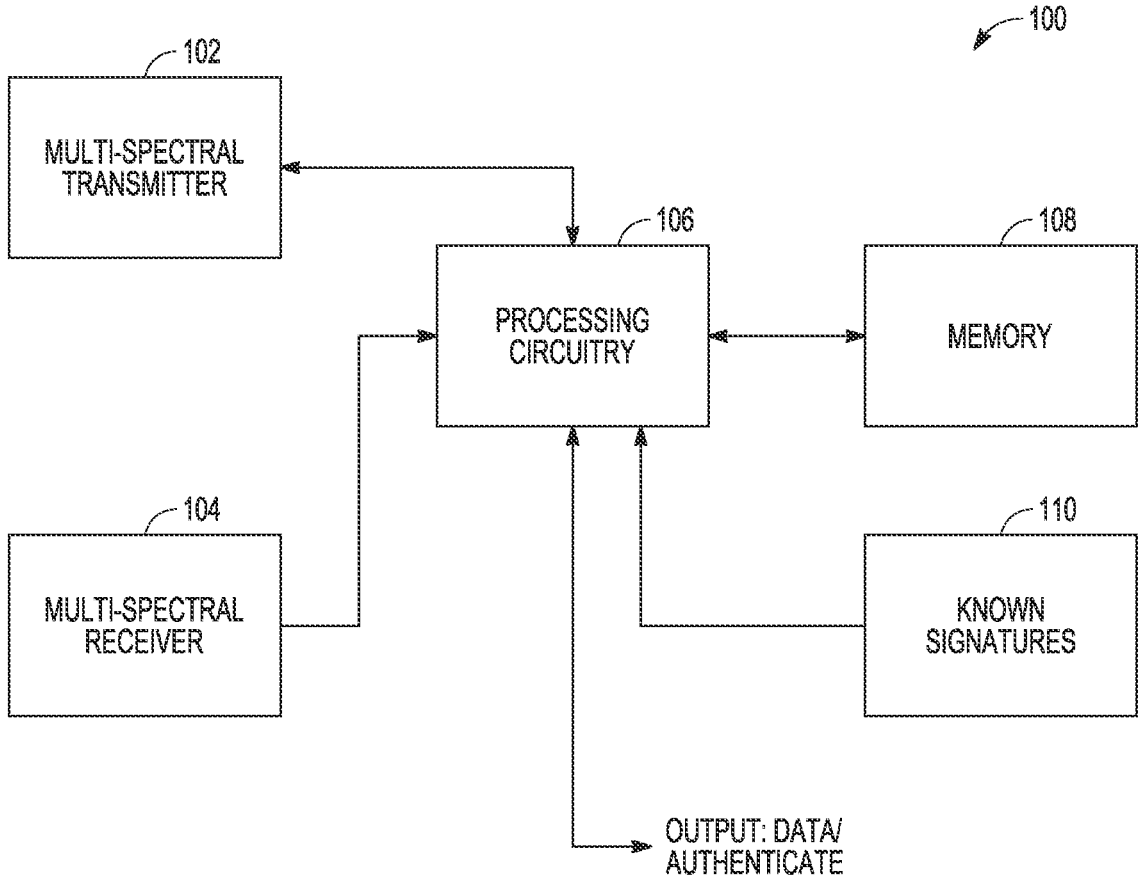
FIG. 1 is a functional diagram of a Cascade Spoof Proof Extra-layer Radiant Authentication (CASPER-A) system in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Current authentication approaches using optical spectral signatures do not offer robust uniqueness capability at practical implementation stand-off detection scenarios. Counterfeit optical based signatures methods with high specificity are only employable for in-situ testing and are not practical for supply chain standoff-speed of commerce and other scenarios. Conventional RF based authentication techniques are limited in standoff ranges in addition to being restrictive in uses where electromagnetic (EM) energy is strictly prohibited. Furthermore, some conventional authentication methods that utilize radio-frequency identification (RFID) tags, capacitor grid array, and optical techniques are limited to near in-situ sensing, do not offer standoff capability and are restrictive where sensitive material prohibits EM energy field presence. Conventional multi-spectral signature techniques require in-situ complex test and verification set up, do not provide real-time or standoff capabilities. Conventional nano-feature high-bit density signatures do not provide spectral diversity in robust standoff interrogation techniques.

Embodiments disclosed herein provide for authentication using spectrally-coded taggants. Some embodiments are directed to a Cascade Spoof Proof Extra-layer Radiant Authentication (CASPER-A) system using spectrally-coded taggants. In some embodiments, the system may be configured to transmit a multi-wavelength optical interrogation signal to interrogate a nanotag associated with a device. A multi-spectral optical receiver may be configured to receive and decode a response to the interrogation signal. The response may comprise a multi-spectral emission generated by the nanotag. Processing circuitry may generate data from the decoded response. To authenticate the device or item associated with the nanotag, the processing circuitry may generate a digital signature. In some embodiments, the nanotag may comprise a multi-layered nanocrystal (NC) activated composite material comprising multiple layers configured to generate a multi-spectral emission from optical excitation by an optical interrogation signal. Each layer may comprise a heterogeneously dispersed volume embedded with quantum dots (Qdots). The Qdots may be configured to generate a multi-spectral emission based on an interaction of one or more wavelengths among Qdot emitters by intercoupling. These embodiments are described in more detail below.

Some embodiments provide for optical (non RF/EM) based authentication that is self-contained, autonomous, and standoff, suitable for speed of commerce capability. In some embodiments, a spectrally unique robust authentication method using robust components and devices addresses the full spectrum of authentication protection. In some embodiments, a method of generating a remote standoff stealth counterfeit proof authentication of controlled goods at speed of commerce is provided. In some embodiments, a self-contained autonomous authentication system is based on embedded multi-modality interrogation and authentication methods utilizing tailored Qdot emitters spanning the ultra-violet to infrared (UV-IR) spectral range. Some embodiments utilize a robust (e.g., over extreme environmental conditions) encapsulant with good optical transparency from the UV through the short-range infrared (SWIR) spectral range. In some embodiments, a multi-spectral layer with IR Qdots provides encoded information and/or unique signature with stealth anti-spoof interrogation and emission signals. In some embodiments, a detector array, having a small number of elements, is configured with spectral matched filters to provide for high SNR with a remote interrogation standoff range. In some embodiments, embedded layering affords self-contained autonomous authentication enabled by small footprint. These embodiments are described in more detail below.

Although many of the embodiments disclosed herein employ Qdot emitters, the scope of the embodiments are not limited in this respect. Embodiments may also be applicable to other types of emitters, such as nano-wires and directional structures that may generate multi-spectral emissions.

In some of these embodiments, an ultra-low footprint may be amenable to microelectronics authentication. In some embodiments, coding of information is provided in the material. Some embodiments provide for production speed tag deposition and fast role-based authentication. Some embodiments utilize a quantization of spectra, including wavelength, intensity, and morphology (i.e., peak width). Some embodiments provide for a unique identification with custom material mixes, randomized interferents, and dual-use random signature variation. These embodiments are described in more detail below.

Some embodiments provide a tailored bandgap Qdot incorporation in UV-medium range IR (MWIR) transmitting polymer hosts. Some embodiments provide a spectrally diverse Qdot emission architecture providing depth of information embedded with fine control of spectral bands. Some embodiments provide stealth layer modality for anti-counterfeiting and anti-spoofing implementations. Some embodiments provide multi wavelength light source interrogation diversity in the UV and IR spectra (i.e., not visible stealth excitation and stealth IR emission). Some embodiments provide a spectral matched detector array receiver for remote standoff interrogation and authentication detection at the speed of commerce. Some embodiments provide for utilization of an optically thin paint overcoat that may be substantially transparent to excitation and emission wavelengths for added stealth and/or anti-spoofing robustness. Some embodiments provide for complexity of information generated via interacting layers and/or multiple layers including a non-discrete transition zone layering for non-reproducibility. Some embodiments are fully capable to standoff sensing modality where RF field EM energy-based methods are prohibited. Some embodiments provide for weapons safe operation (for both fuel and ordnance) unlike some RFID solutions.

Some embodiments utilize deliberate combinations of varying thickness and absorption factors based on Qdot concentrations as a variable in order to generate random and/or unique spectral signature. In some embodiments, a deliberate utilization of transition zones between layers may be provided for assuring non reproducibility.

Some embodiments provide an optically excited standoff sensor arrangement with unique combinations of varying thickness and absorption factors based on Qdot concentrations for generate random and/or unique spectral signature, and deliberate utilization of transition zones between layers for assuring non reproducibility. Some embodiments provide a SWIR Qdot base emitter specifically for stealth authentication.

Some embodiments utilize incoherent spectral modality using collimated incoherent LEDs or basic waveform (pulsed) solid state laser excitation sources and robust composite Qdot activated "paint" structures which may be readily concealed under paint providing for significant standoff range sensing enabled by spectral matched filter detectors enabling a compact robust interrogation authentication method with speed of commerce capability.

FIG. 1 is a functional diagram of a Cascade Spoof Proof Extra-layer Radiant Authentication (CASPER-A) system using spectrally-coded taggants in accordance with some embodiments. In some of these embodiments, the system 100 may comprise an optical (UV/IR) transmitter 102 (e.g., a multi-wavelength light source) configured to transmit a single or multi-wavelength optical interrogation signal to interrogate a nanotag associated with a device. The system 100 may also include a multi-spectral optical receiver 104 configured to receive and decode a response to the interrogation signal. The response may comprise a multi-spectral emission generated by the nanotag. The system may also include processing circuitry 106 to generate data from the decoded response. In these embodiments, to authenticate the device associated with the nanotag, the processing circuitry may be configured to generate a digital signature for comparison with known digital signatures 110, although the scope of the embodiments is not limited in this respect. In some embodiments, the processing circuitry may comprise one or more processors and may be configured with instructions stored in memory 110.

Figure 2:
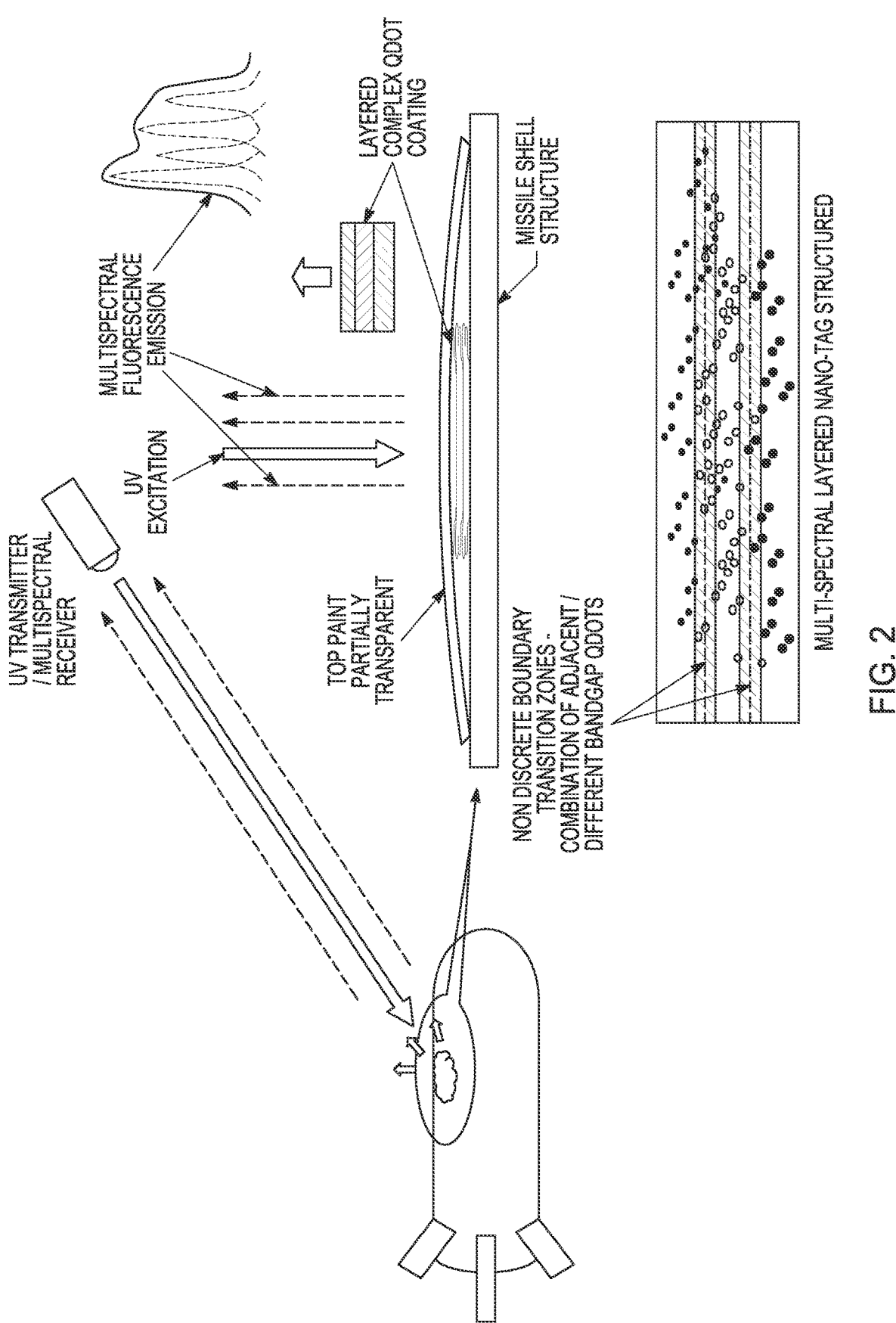
FIG. 2 is an operational diagram of a CASPER-A system in accordance with some embodiments.

FIG. 2 is an operational diagram of a CASPER-A system in accordance with some embodiments.

Figure 3:
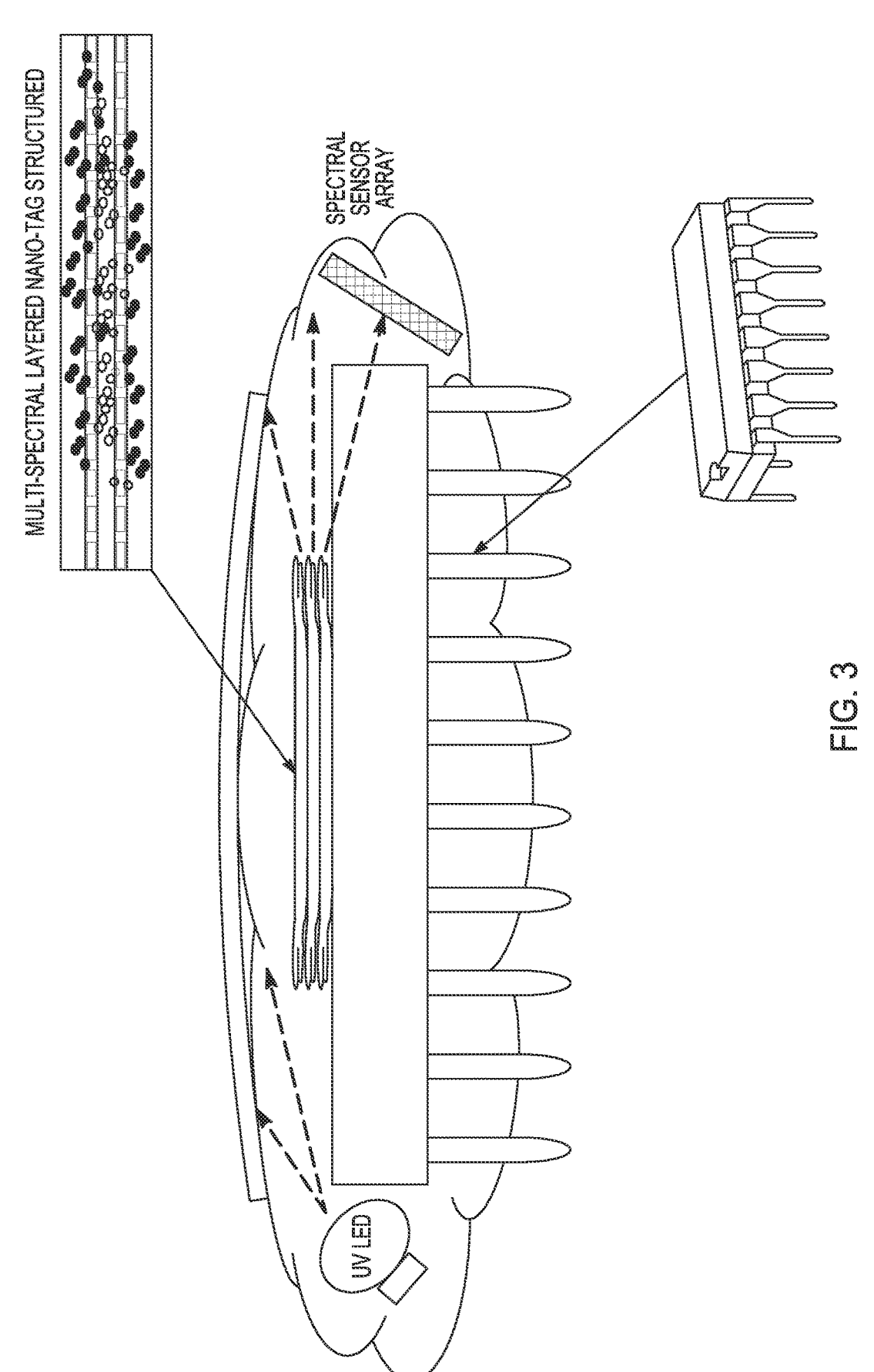
FIG. 3 illustrates the use of a multi-layered nanocrystal (NC) activated composite material comprising a nanotag provided on a semiconductor chip, in accordance with some embodiments.

FIG. 3 illustrates the use of a multi-layered nanocrystal (NC) activated composite material comprising a nanotag provided on a semiconductor chip, in accordance with some embodiments. In these embodiments, the nanotag may comprise a multi-layered nanocrystal (NC) activated composite material comprising either insulating or semiconducting. The MC activated composite material may comprise multiple layers configured to generate a multi-spectral emission from optical excitation by the optical interrogation signal (i.e., a remote optical source). In these embodiments, each layer may comprise a heterogeneously dispersed volume embedded with quantum dots (Qdots). In these embodiments, the Qdots of the multiple layers may be configured to generate a multi-spectral emission based on an interaction of one or more wavelengths among Qdot emitters by intercoupling. In these embodiments, the Qdots of the multiple layers may comprise varied semiconductor compositions and dimensions to produce bandgap energies commensurate with resonant emission spectra. In these embodiments, each layer may be embedded with Qdots of various semiconductor composition (e.g., binary and/or tertiary and including but not limited to CdS, PbSe, InGaAs, InPCu, etc.). In these embodiments, the Qdots of each layer may comprise various dimensions and/or sizes to produce a multitude of bandgap energies commensurate with resonant emission spectral wavelength/frequency peaks/centers. In these embodiments, the Qdots of the multiple layers may be configured to emit a multi-spectral emission based on an interaction of one or more wavelengths among Qdot emitters via intercoupling either via radiative energy transfer (radiative re-emission and re-absorption) or non-radiative (e.g., non-radiative near proximity energy transfer). In these embodiments, multiple heterogenous bandgaps and/or sizes and heterogeneous layering and/or volumetric incorporation may generate avalanche spectral signal propagation and/or evolution through the heterogeneous NC activated volume spectral emission signal shaping with randomness and/or uniqueness.

In some embodiments, the intercoupling comprises at least one of a radiative energy transfer or non-radiative energy transfer. The radiative energy transfer may comprise a radiative re-emission and re-absorption. The non-radiative may comprise a non-radiative near proximity energy transfer.

In some embodiments, the configuration of the Qdots within the multiple discrete and/or random volumetric compiled layers may be selected to encode data that is unique to the individual nanotag comprised of plurality of bandgaps and sizes commensurate with varying fluorescence emission wavelength peaks and emission intensities. This configuration may comprise one or more of size, shape, spacing, and bandgap properties. In these embodiments, data that is uniquely encoded in the nanotag may be decoded. In these embodiments, a digital signature, based on the multi-spectral fluorescence emission, may be used to authenticate a device (e.g., for comparison with a known digital signature 110), although the scope of the embodiments is not limited in this respect.

In some embodiments, the nanotag may comprise an optical taggant.

In some embodiments, the nanotag comprises a transition zone between layers. In these embodiments, the layers may have a varied thickness and different concentrations of Qdots to provide unique spectral signature with both spectral and intensity emission diversity. In these embodiments, to help assure non-reproducibility, a unique and random spectral signature may be obtained by varying thickness and absorption factors based on Qdot concentrations as well as the use of transition zones between layers.

Figure 4A:
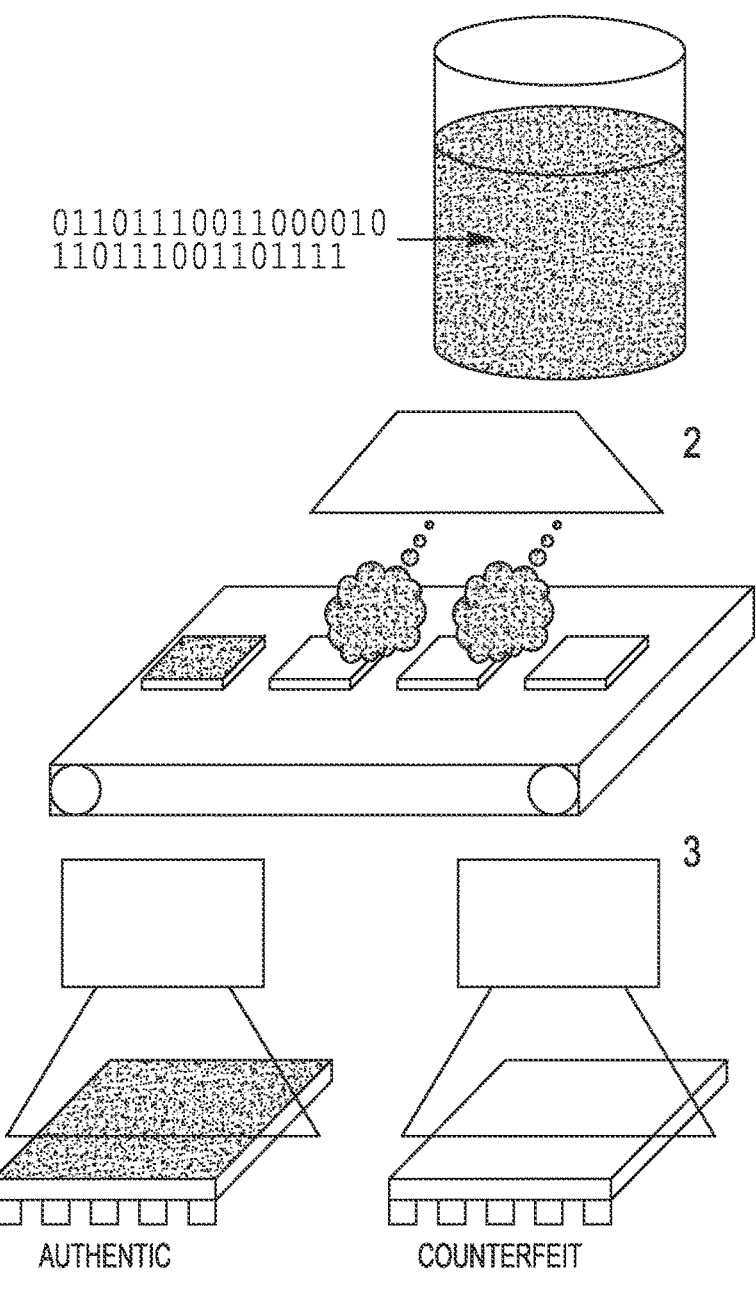
FIG. 4A illustrates the generation of information, such as data or a digital signature, using a multi-layered NC activated composite material, in accordance with some embodiments.
Figure 4B:
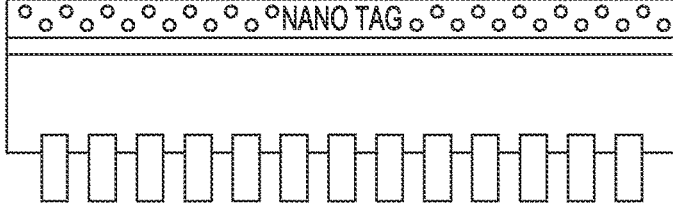
FIG. 4B illustrates a nanotag positioned on an item, in accordance with some embodiments.
Figure 4C:
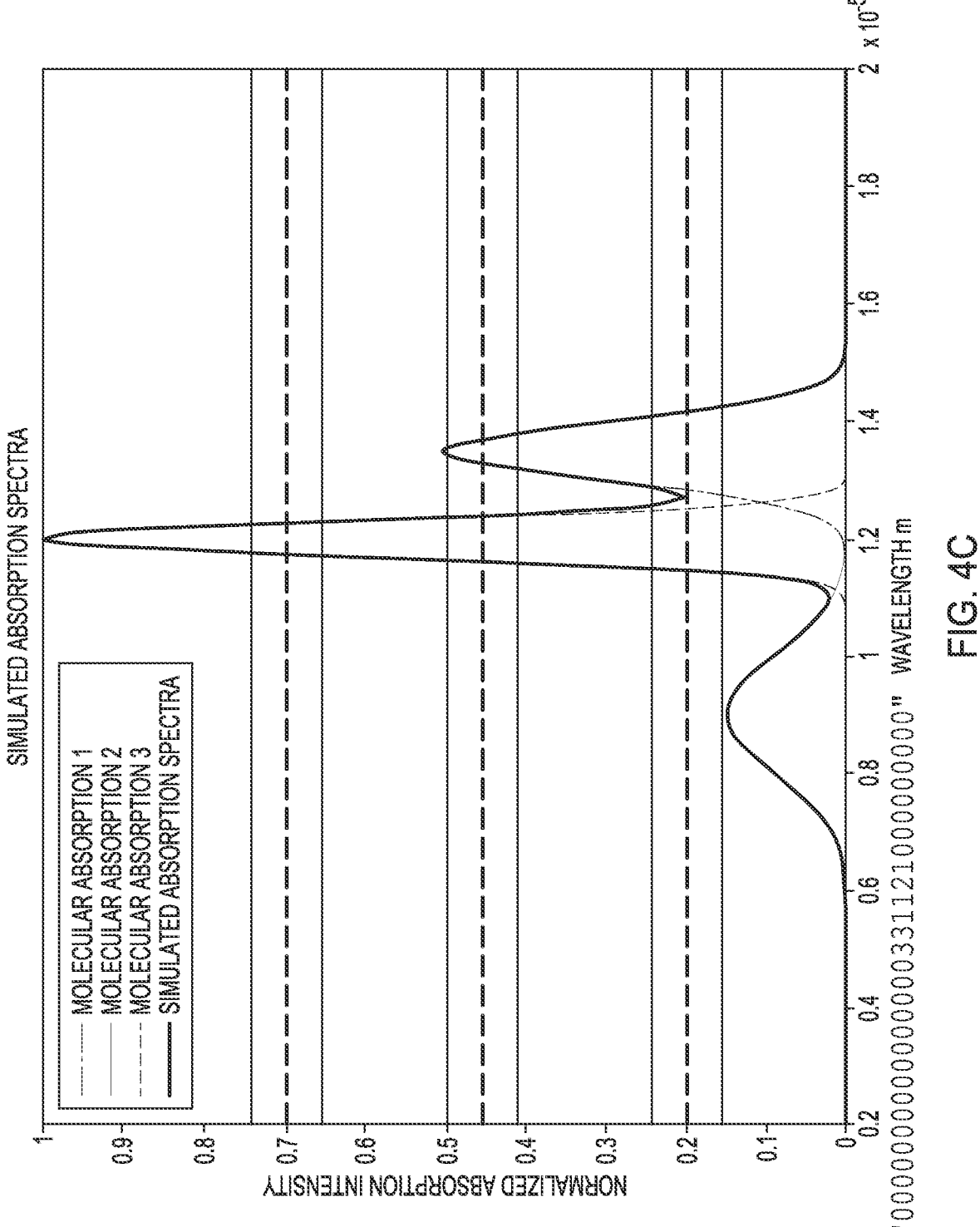
FIG. 4C illustrates an example of a multi-spectral emission generated by the nanotag, in accordance with some embodiments.

FIG. 4A illustrates the generation of information, such as data or a digital signature, using a multi-layered NC activated composite material, in accordance with some embodiments. In some embodiments, the processing circuitry may be configured to decode the data that is encoded within the multiple layers of the nanotag by quantizing spectra of the multi-spectral fluorescence emission. The spectra may comprise one or more spectral peaks and valleys. In these embodiments, each spectral peak may be associated with a wavelength, peak width, and intensity level. In these embodiments, each nanotag may provide encoded information that is unique to the specific nanotag when interrogated is a specific interrogation signal. Accordingly, each nanotag may have unique multi-spectral signature. FIG. 4B illustrates a nanotag positioned on an item, in accordance with some embodiments. FIG. 4C illustrates an example of a multi-spectral emission generated by the nanotag, in accordance with some embodiments.

In some embodiments, the optical interrogation signal comprises one or more wavelengths in the UV and/or IR spectral range including the SWIR and MWIR spectral ranges. In these embodiments, depending on bandgaps of Qdots, the excitation wavelength may be selected to be just shorter than the bandgap wavelength so as to ensure efficient excitation absorption. The excitation wavelength may be chosen, for example, to be UV, visible or Infrared depending on ion the design choice of the Qdots. In some instances where covertness is desired, both the excitation and emission signals may be outside of the visible range (either entirely in the UV band or entirely in the IR band). If excitation wavelength is desired to be invisible to human eye, UV excitation wavelength may be utilized, while the emission signal wavelength may be in the visible band where common sensitive imaging detector arrays may be utilized.

In some embodiments, the encoded data may comprise a bit sequence having a number of bits (e.g., see FIG. 4A). In these embodiments, the processing circuitry is further configured to select a quantization level (i.e., a resolution level) for quantizing the spectra of the multi-spectral fluorescence emission. The quantization level may be configured to correspond with the number of bits, although the scope of the embodiments is not limited in this respect. In these embodiments, a lower quantization level corresponds to a lower number of bits. In these embodiments, a higher quantization level corresponds to a higher number of bits.

In some embodiments, for the lower quantization level, a lower number of wavelengths of the multi-spectral fluorescence emission may be sampled. In these embodiments, for the higher quantization level, a greater number of wavelengths of the multi-spectral fluorescence emission may be sampled. In these embodiments, a higher-bit analog-to-digital converter (ADC) may be used for higher quantization levels to generate the output bit sequence, and a lower bit ADC may be used for lower quantization levels to generate the output bit sequence. In some embodiments, a lower quantization level may be selected for determining high-level properties of the device, including a device type or device category, from the nanotag. In these embodiments, a higher quantization level is selected for determining individual device-specific information (i.e., device serial number). For example, when nanotags are used for controlled items such as currency, a lower level of quantization (less bits) may be used to determine the value of the currency (i.e., whether or not the item is a 20 dollar bill or a one-hundred dollar bill) and the higher layer of quantization (more bits) to determine a serial number of the currency. In some embodiments, the device associated with the nanotag is a controlled item comprising one of: a controlled document, currency, and an electronic device including a semiconductor device (i.e., a computer chip, microprocessor, etc.). In some embodiments, the Qdots of the multiple layers of the nanotag are deposited in a randomized manner to provide a spectral response when interrogated that comprises a unique spectral signature. In these embodiments, the randomization of the Qdots provides for anti-counterfeiting properties.

In some embodiments, a physically unclonable function (PUF) may be used to deposit the Qdots. In these embodiments, a mixture of Qdots having varied size, shape, spacing, and bandgap properties may be used to help ensure that the nanotag as a unique spectral signature. In some embodiments, the multi-spectral layered semiconductor material comprises a layered complex Qdot coating (e.g., see FIG. 3).

In some embodiments, the Qdots of the multiple layers may be configured to emit the multi-spectral fluorescence emission (see FIG. 4C) based on an interaction of one or more wavelengths among the multiple layers, such that, when interrogated by the interrogation signal, an emission of one or more wavelengths produced by one or more of the layers causes another one or more of the layers to produce emissions of one or more other wavelengths. In these embodiments, a first wavelength of the interrogation signal may cause one or more of the layers of the nanotag to emit a second and a third wavelength. The second wavelength (or the third wavelength) may cause one of the layers to emit a fourth different wavelength. The characteristics of second, third and fourth wavelengths (i.e., the spectral signature of the multi-spectral fluorescence emission) caused by interrogation by the first wavelength, may represent the data encoded in the nanotag and may be used to authenticate the nanotag. Examples are illustrated in FIG. 4A, FIG. 4B and FIG. 4C.

In some embodiments, the multi-spectral optical receiver comprises an optical detector array with spectral matched filters allowing for high SNR and a remote interrogation standoff range. In some embodiments, the optical transmitter comprises collimated incoherent LEDs configured to generate an incoherent multi-wavelength optical interrogation signal. Some of these embodiments may utilize incoherent spectral modality using collimated incoherent LEDs or a waveform (e.g., pulsed) solid state laser excitation sources and robust composite Qdot activated "paint" structures that may be readily concealed under paint providing for significant standoff range sensing enabled by spectral matched filter detectors enabling a compact robust interrogation authentication method with speed of commerce capability.

In some embodiments where a large standoff interrogation and resultant signal detection range is desired, a modest coherence length laser may be employed to leverage phase information of the emission signal for reducing noise and/or improving signal to noise ratio (SNR).

In some embodiments, a keyed interrogation source may be employed where a sequence of specific temporal and/or pulsed illumination and/or excitation is utilized and a corresponding time-based correlator may be employed at the receiver to increase the SNR, which may be especially advantageous for large standoff interrogation and detection.

In some embodiments, the Qdots may comprise GaN generated by epitaxial growth in a matrix, although the scope of the embodiments is not limited in this respect. In these embodiments, the spectrum of the multi-spectral fluorescence emission may be determined by growth size and intensity of the multi-spectral fluorescence emission is determined by material selection of the matrix. In some embodiments, the matrix material may comprise ALGaN grown on a Si substrate, although the scope of the embodiments, is not limited in this respect.

Although the device is illustrated in FIG. 1 as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer system). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 5:
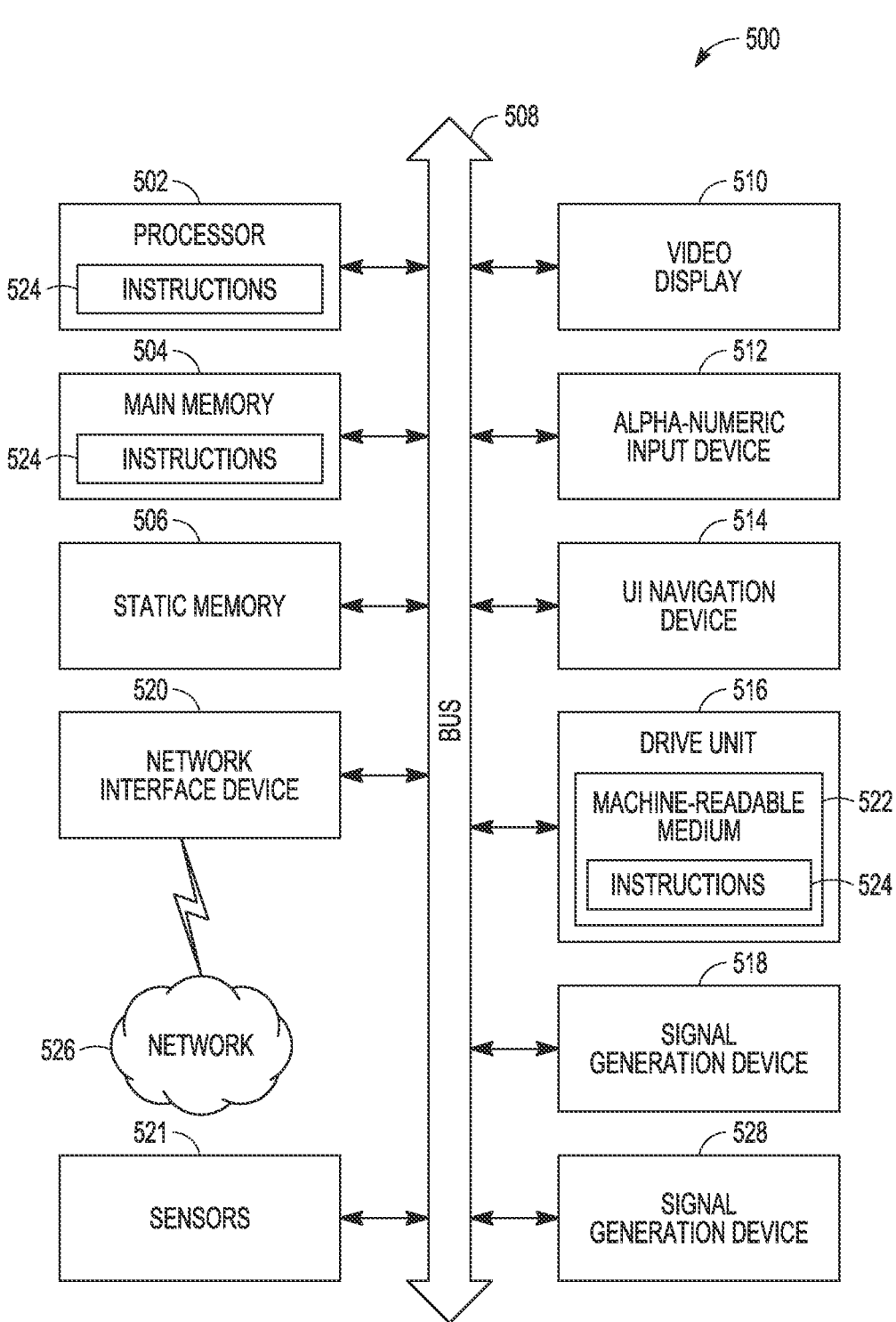
FIG. 5 illustrates a functional block diagram of a processing system, in accordance with some embodiments.

FIG. 5 illustrates a block diagram of an example system 500 upon which any one or more of the techniques (e.g., methodologies) discussed herein may perform. In some embodiments, system 100 may be configured to implement one or more operations performed by Cascade Spoof Proof Extra-layer Radiant Authentication (CASPER-A) system 100 (FIG. 1). In alternative embodiments, the system 500 may operate as a standalone device or may be connected (e.g., networked) to other systems. In a networked deployment, the system 500 may operate in the capacity of a server system, a client system, or both in server-client network environments. In an example, the system 500 may or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a non-transitory computer-readable storage medium. In an example, the software, when executed by the underlying hardware of the module, causes the hardware to perform the specified operations. In some embodiments, the non-transitory computer-readable storage medium may store instructions for execution by one or more processors or processing circuitry, to perform the operations described herein.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Processing system (e.g., computer system) 500 may include processing circuitry such as a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The system 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The system 500 may additionally include a storage device (e.g., drive unit) 516, a signal generation device 518 (e.g., a speaker), a network interface device 520, and one or more sensors 521, such as a global positioning system (GPS) sensor, a compass, an accelerometer, or other sensor. The system 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a computer-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the system 500. In an example, one or any combination of the hardware processor 502, the main memory 504, the static memory 506, or the storage device 516 may constitute computer-readable media.

While the computer-readable medium 522 is illustrated as a single medium, the term "computer-readable medium" may include a single medium or multiple media (e.g., a centralized or distributed database, and/or associated caches and servers) configured to store the one or more instructions 524.

The term "computer-readable medium" may include any medium that is capable of storing, encoding, or carrying instructions for execution by the system 500 and that cause the system 500 to perform any one or more of the techniques of the present disclosure, or that is capable of storing, encoding, or carrying data structures used by or associated with such instructions. Non-limiting computer-readable medium examples may include solid-state memories, and optical and magnetic media. Specific examples of computer-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, computer-readable media may include non-transitory computer-readable media. In some examples, computer-readable media may include computer-readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). The term "transmission medium" shall be taken to include any intangible medium that is capable of storing, encoding or carrying instructions for execution by the system 500, and includes digital or analog communications signals or other intangible medium to facilitate communication of such software.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A Cascade Spoof Proof Extra-layer Radiant Authentication (CASPER-A) system using spectrally-coded taggants, the system comprising: processing circuitry; and memory, the processing circuitry configured to:

cause an optical transmitter to transmit an optical interrogation signal to interrogate a nanotag associated with a device;

cause a multi-spectral receiver to receive a response to the interrogation signal, the response comprising a multi-spectral emission generated by the nanotag; and generate data from the decoded response, wherein to authenticate the device associated with the nanotag, the processing circuitry is configured to generate a digital signature, wherein the nanotag comprises a multi-layered nanocrystal (NC) activated composite material comprising multiple layers configured to generate the multi-spectral emission from optical excitation by the optical interrogation signal, each layer comprising a heterogeneously dispersed volume embedded with quantum dots (Qdots), wherein the Qdots of the multiple layers are configured to generate the multi-spectral emission based on an interaction of one or more wavelengths among Qdot emitters by intercoupling, and wherein the Qdots of the multiple layers comprise varied semiconductor compositions and dimensions to produce bandgap energies commensurate with resonant emission spectra.

2. The system of claim 1, wherein the intercoupling comprises at least one of a radiative energy transfer or non-radiative energy transfer, the radiative energy transfer comprising a radiative re-emission and re-absorption, the non-radiative comprising a non-radiative near proximity energy transfer, and wherein the nanotag comprises a transition zone between layers, wherein the layers have a varied thickness and different concentrations of Qdots to provide unique spectral signature with both spectral and intensity emission diversity.

3. The system of claim 2, wherein the processing circuitry is configured to decode the data that is encoded within the multiple layers of the nanotag by quantizing spectra of the multi-spectral fluorescence emission, the spectra comprising one or more spectral peaks, each spectral peak associated with a wavelength, peak width, and intensity.

4. The system of claim 3, wherein the optical interrogation signal comprises one or more wavelengths in the at least one of UV and IR spectral ranges, and wherein an excitation wavelength is shorter than a bandgap wavelength.

5. The system of claim 4, wherein the data comprises a bit sequence having a number of bits, and wherein the processing circuitry is further configured to select a quantization level for quantizing the spectra of the multi-spectral fluorescence emission, the quantization level corresponding with the number of bits, wherein a lower quantization level corresponds to a lower number of bits, and wherein a higher quantization level corresponds to a higher number of bits.

6. The system of claim 5, wherein for the lower quantization level, a lower number of wavelengths of the multi-spectral fluorescence emission are sampled, wherein for the higher quantization level, a greater number of wavelengths of the multi-spectral fluorescence emission are sampled, wherein a lower quantization level is selected for determining high-level properties of the device, including a device type or device category, from the nanotag, and wherein a higher quantization level is selected for determining individual device-specific information.

7. The system of claim 4, wherein the device associated with the nanotag is a controlled item comprising one of:

a controlled document, currency, and an electronic device including a semiconductor device.

8. The system of claim 4, wherein the Qdots of the multiple layers of the nanotag are deposited in a randomized manner to provide a spectral response when interrogated that comprises a unique spectral signature.

9. The system of claim 8, wherein deposition of the Qdots is in accordance with a physically unclonable function (PUF).

10. The system of claim 8, wherein multi-spectral layered semiconductor material comprises a layered complex Qdot coating.

11. The apparatus of claim 4, wherein the Qdots of the multiple layers are configured to emit the multi-spectral fluorescence emission based on an interaction of one or more wavelengths among the multiple layers, such that, when interrogated by the interrogation signal, an emission of one or more wavelengths produced by one or more of the layers causes another one or more of the layers to produce emissions of one or more other wavelengths.

12. The system of claim 4, wherein the multi-spectral receiver comprises an optical detector array with spectral matched filters, and wherein the optical transmitter comprises collimated incoherent LEDs configured to generate an incoherent multi-wavelength optical interrogation signal.

13. The system of claim 4, wherein the Qdots comprise GaN generated by epitaxial growth in a matrix, wherein a spectrum of the multi-spectral fluorescence emission is determined by growth size and intensity of the multi-spectral fluorescence emission is determined by material selection of the matrix.

14. A non-transitory computer-readable storage medium that stores instructions for execution by processing circuitry of a Cascade Spoof Proof Extra-layer Radiant Authentication (CASPER-A) system that uses spectrally-coded taggants, the processing circuitry configured to:

cause an optical transmitter to transmit an optical interrogation signal to interrogate a nanotag associated with a device;

cause a multi-spectral receiver to receive a response to the interrogation signal, the response comprising a multi-spectral emission generated by the nanotag; and generate data from the decoded response, wherein to authenticate the device associated with the nanotag, the processing circuitry is configured to generate a digital signature, wherein the nanotag comprises a multi-layered nanocrystal (NC) activated composite material comprising multiple layers configured to generate the multi-spectral emission from optical excitation by the optical interrogation signal, each layer comprising a heterogeneously dispersed volume embedded with quantum dots (Qdots), wherein the Qdots of the multiple layers are configured to generate the multi-spectral emission based on an interaction of one or more wavelengths among Qdot emitters by intercoupling, and wherein the Qdots of the multiple layers comprise varied semiconductor compositions and dimensions to produce bandgap energies commensurate with resonant emission spectra.

15. The non-transitory computer-readable storage medium of claim 14, wherein the intercoupling comprises at least one of a radiative energy transfer or non-radiative energy transfer, the radiative energy transfer comprising a radiative re-emission and re-absorption, the non-radiative comprising a non-radiative near proximity energy transfer, and wherein the nanotag comprises a transition zone between layers, wherein the layers have a varied thickness and different concentrations of Qdots to provide unique spectral signature with both spectral and intensity emission diversity.

16. The non-transitory computer-readable storage medium of claim 15, wherein the processing circuitry is configured to decode the data that is encoded within the multiple layers of the nanotag by quantizing spectra of the multi-spectral fluorescence emission, the spectra comprising one or more spectral peaks, each spectral peak associated with a wavelength, peak width, and intensity.

17. A nanotag comprising:

a multi-layered nanocrystal (NC) activated composite material comprising multiple layers configured to generate a multi-spectral emission from optical excitation by an optical interrogation signal, each layer comprising a heterogeneously dispersed volume embedded with quantum dots (Qdots), wherein the Qdots of the multiple layers are configured to generate the multi-spectral emission based on an interaction of one or more wavelengths among Qdot emitters by intercoupling, and wherein the Qdots of the multiple layers comprise varied semiconductor compositions and dimensions to produce bandgap energies commensurate with resonant emission spectra.

18. The nanotag of claim 17, wherein the intercoupling comprises at least one of a radiative energy transfer or non-radiative energy transfer, the radiative energy transfer comprising a radiative re-emission and re-absorption, the non-radiative comprising a non-radiative near proximity energy transfer, and wherein the nanotag comprises a transition zone between layers, wherein the layers have a varied thickness and different concentrations of Qdots to provide unique spectral signature with both spectral and intensity emission diversity.

19. The nanotag of claim 18, wherein data is encoded within the multiple layers of the nanotag by quantizing spectra of the multi-spectral fluorescence emission, the spectra comprising one or more spectral peaks, each spectral peak associated with a wavelength, peak width, and intensity.

20. The system of claim 19, wherein the optical interrogation signal comprises one or more wavelengths in the at least one of UV and IR spectral ranges, and wherein an excitation wavelength is shorter than a bandgap wavelength.

* * * * *